United States Patent [19]

Minh

[11] Patent Number: 5,593,475
[45] Date of Patent: Jan. 14, 1997

[54] MIXED BED ADSORBER

[75] Inventor: Pham H. Minh, Houston, Tex.

[73] Assignee: Liquid Air Engineering Corporation, Houston, Tex.

[21] Appl. No.: 422,024

[22] Filed: Apr. 13, 1995

[51] Int. Cl.⁶ .................................................. B01D 53/04
[52] U.S. Cl. ........................ 95/123; 95/126; 95/139; 96/128; 96/130; 96/132; 96/144
[58] Field of Search ............................. 95/106, 117–126, 95/139; 96/108, 121, 122, 126–132, 143, 144, 154

[56] References Cited

U.S. PATENT DOCUMENTS

| | | | |
|---|---|---|---|
| 3,150,942 | 9/1964 | Vasan | 95/122 X |
| 3,738,084 | 6/1973 | Simon et al. | 96/126 X |
| 4,249,915 | 2/1981 | Sircar et al. | 55/26 |
| 4,541,851 | 9/1985 | Bosquain et al. | 96/126 |
| 4,627,856 | 12/1986 | von Gemmingen | 95/120 |
| 4,698,072 | 10/1987 | Rohde et al. | 95/119 |
| 4,698,073 | 10/1987 | Rohde et al. | 96/130 X |
| 4,711,645 | 12/1987 | Kumar | 95/122 X |
| 4,812,147 | 3/1989 | BeVier | 55/25 |
| 5,071,449 | 12/1991 | Sircar | 95/122 X |
| 5,176,721 | 1/1993 | Hay et al. | 96/143 X |
| 5,232,479 | 8/1993 | Poteau et al. | 96/131 |
| 5,447,558 | 9/1995 | Acharya | 95/122 X |

FOREIGN PATENT DOCUMENTS

| | | | |
|---|---|---|---|
| 0004465A2 | 3/1979 | European Pat. Off. | |
| 0486926A1 | 11/1991 | European Pat. Off. | |
| 0512781 | 11/1992 | European Pat. Off. | 96/126 |
| 0612554A1 | 2/1994 | European Pat. Off. | |
| 3045451A1 | 12/1980 | Germany. | |
| 3413861A1 | 4/1984 | Germany. | |
| 3342447 | 5/1984 | Germany | 96/130 |
| 3939518 | 6/1991 | Germany | 96/108 |
| 59-039325 | 3/1984 | Japan | 96/130 |
| 62-298425 | 12/1987 | Japan | 96/128 |
| 63-049223 | 3/1988 | Japan | 96/128 |
| 63-049224 | 3/1988 | Japan | 96/128 |
| 1607903 | 11/1990 | U.S.S.R. | 96/131 |
| 0563379 | 8/1944 | United Kingdom | 96/128 |

Primary Examiner—Robert Spitzer
Attorney, Agent, or Firm—Robert D. Touslee

[57] ABSTRACT

A process and system for removing contaminants from air comprises flowing a compressed air stream comprising water and carbon dioxide to a first adsorbent zone for contacting with a first adsorbent effective in the adsorption of water by flowing the air in a direction within the first adsorbent zone parallel with the axis of the first adsorbent zone to form a dry gas; flowing the dry gas from the first vessel to a second adsorbent zone comprising a second adsorbent disposed in a radial arrangement about the same axis to remove carbon dioxide. Regeneration of the adsorbent beds may be carried out independently.

17 Claims, 3 Drawing Sheets

MIXED BED ADSORBER

FIELD OF THE INVENTION

The present invention relates to removal of impurities from a multicomponent gaseous stream by adsorption.

BACKGROUND OF THE INVENTION

In gas processing at cryogenic temperatures, particularly with air separation processes, it is required to remove impurities from the feed stream. In the case of an air separation process, moisture, carbon dioxide and hydrocarbon components must be removed to minimum levels prior to the feed stream being processed to cryogenic temperatures. A conventional method used to carry out removal of contaminants from such streams is adsorption whereby the gaseous feed stream is contacted with adsorbents to transfer components from the gaseous feed stream to the adsorbent material. In the case of air separation, the adsorption process is conducted by passing the incoming feed stream of compressed air through a first adsorbent material which preferentially adsorbs water and thereafter through a second adsorption material which preferentially adsorbs carbon dioxide. Adsorbent material requirements are somewhat reduced in a multiadsorbent system due to the removal of water, the more strongly sorbed component prior to removal of less strongly sorbed components.

For all adsorber systems, there are design and operational considerations common to all. It is usually necessary to have a minimum of two adsorbers. One adsorber is in production and the other available for regeneration, usually using dry gas. In the case of air separation, the quantity of the first sorbent material is typically on the order of between about 50% and 70% of that quantity of second sorbent material depending on feed gas temperature. For air separation, the first sorbent is typically alumina spheres and the second sorbent material is molecular sieve. Typically in existing adsorber systems, the alumina spherical diameters are about 3 to 6 millimeters in diameter, and the molecular sieves are between about 1 and 3 millimeters in diameter. Due to the small spherical nature of the sorbent materials, fluidization is a common design problem, and therefore, gas velocity through the sorbent beds is constrained. However, it is generally more difficult to regenerate the first sorbent alumina material than to regenerate the molecular sieve sorbents due to the fact water adheres to the alumina spheres with much greater force than carbon dioxide adheres to the molecular sieve sorbents.

In practice today, there are generally two types of adsorber systems. The first available system, a horizontal type adsorber, consists of two or more sequentially oriented sorbent beds in the flow path of a multicomponent gas stream. With horizontal adsorbers, feed gas flows through a first zone wherein certain contaminants are sorbed onto the sorbent material, and thereafter, the gas flows in the same or parallel direction to a second bed of sorbent material wherein other contaminants are removed. To regenerate horizontal adsorbers, the gas flow is reversed.

However, there are many inherent design problems with horizontal bed adsorbers. Limitations on diameter will dictate a maximum feed air or regeneration gas flow. Generally, both beds must be regenerated at the same time, and therefore, subjected to the same heat and mass flow. Horizontal bed adsorbers typically have no direct access to the lower bed of sorbent material, therefore, creating safety and degeneration concerns. To compensate, operators are forced to use more adsorbent material and endure the increase in pressure drop and energy usage during regeneration.

The second type of adsorber systems now available are termed radial bed adsorbers, wherein concentric beds of adsorbent material are displaced about a center axis. A gas flows perpendicular to the access through the one or more radial beds to adsorb one or more contaminants from the gas. Although radial bed adsorbers possess lower pressure drop and less tendency for fluidization of adsorbent versus horizontal bed adsorbers described above, there remain several significant disadvantages with radial bed designs. The bed dividers are subject to thermal stress problems and demand complicated support systems. A tendency for contaminated gas to by-pass one or more adsorbent beds, wherein adsorbents have settled even slightly, creates a severe operational problem. With radial designs, the vessel height is determined by one of the plurality of adsorbent beds. Because the bed thickness is determined by a minimum residence time of the contaminated gas in the adsorbent bed, a larger volume of other adsorbents than would otherwise be required must be used. This results in a higher cost than would otherwise be required for the second adsorbent material, and other associated costs with greater adsorbent beds than necessary.

As with the horizontal bed designs most commonly used, regeneration of either bed requires gas to be flowed through both beds concurrently. Therefore, the entire volume of regeneration gas must flow through both beds throughout the entire regeneration cycle. This results in an undesirable increase in energy usage, as well as an increased cycle time for regeneration.

Many attempts at improving the operation and performance features of both horizontal and radial bed adsorber systems have been made, meeting with various degrees of success. Due to the multitude of operational and design problems associated with adsorber systems presently available, an improved system to remove contaminants from a gaseous feed stream is much desired.

SUMMARY OF THE INVENTION

In accordance with the present invention, a process and adsorber system is provided to remove one or more contaminants from a gaseous feed stream. In the preferred embodiment, the process for removing contaminants from a gaseous feed stream comprises flowing a gas comprising moisture and carbon dioxide to a first adsorbent zone and contacting said gas with a first adsorbent effective in the adsorption of moisture by flowing said gas in a direction within said first adsorbent zone parallel with the axis of said first vessel to form a dry gas and thereafter flowing said dry gas from said first vessel to a second adsorbent zone comprising a second adsorbent disposed in a radial arrangement about said axis and contacting said dry gas with said second adsorbent effective in retention of carbon dioxide in said second adsorbent zone by flowing said dry gas through said radial bed from the interior to the exterior of said radial bed.

The adsorber and process of the present invention retains the advantageous features of horizontal bed adsorbers and combines the ability to achieve a high gas velocity through the second bed of a radial design. The overall adsorber system displays a low pressure drop and permits unique flexibility to regenerate selectively each bed within the adsorber system. Among other factors, the adsorber system in accordance with the present invention allows optimum sizing of each adsorber bed and further permits cycle and regeneration times to be optimized.

Moreover, the adsorbers in accordance with the present invention achieve the aforementioned optimum performance using a quantity of alumina based adsorbents which is much less than would be required in any adsorber system presently available. Therefore, the volume of molecular sieve adsorbent is the controlling factor in adsorber design according to the present invention. With the adsorber systems of the present invention, it is possible to separately access the adsorbent beds to replace adsorbent material, thereby increasing the economy of the operation.

Regeneration of the adsorbent beds in the adsorbers of the present invention may be carried out selectively to optimize the overall process. When deployed in an adsorber system, a plurality of the adsorbers of the present invention achieve optimum regeneration and cycle time thereby resulting in significant savings.

DETAILED DESCRIPTION OF THE PREFERRED EMBODIMENT

Figure 1:
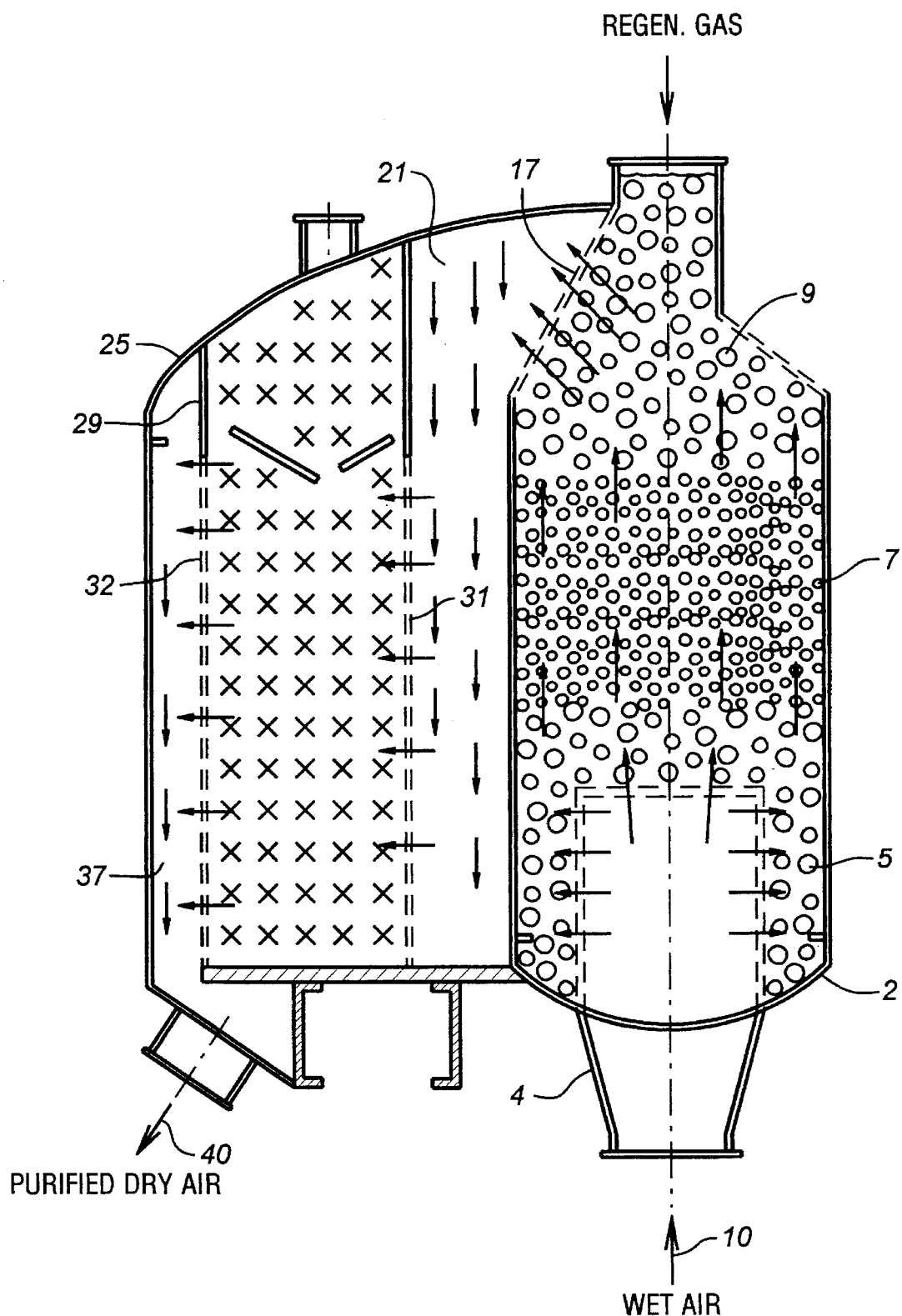
FIG. 1 is a cross-sectional view of the mixed bed adsorber of the present invention.
Figure 2:
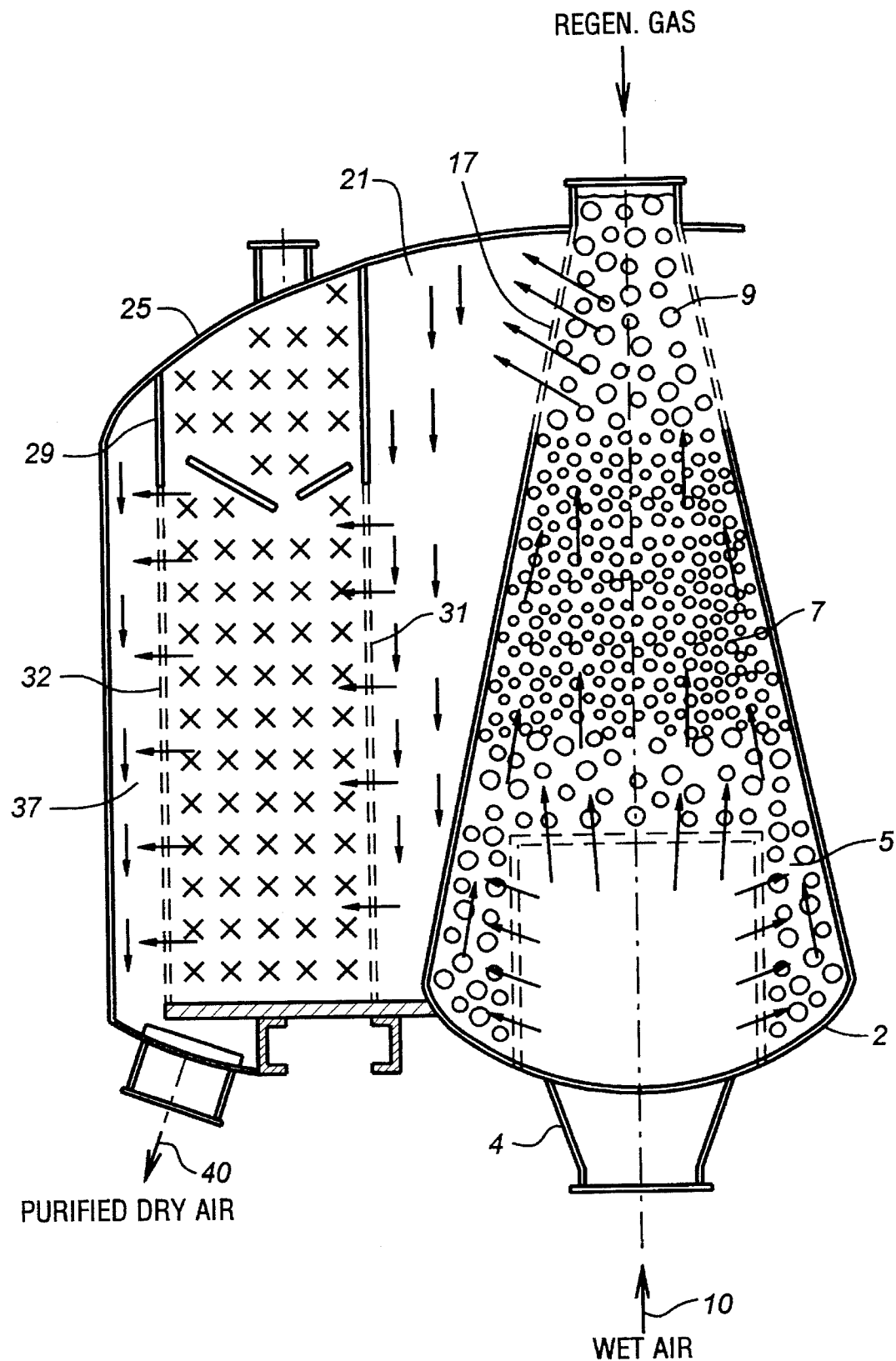
FIG. 2 is an alternate embodiment with a decreasing diameter of the first adsorbent bed.

Referring now to FIG. 1 and the preferred embodiment, wet feed air from a compressor (not shown) at a pressure between about 50 and about 250 psia is flowed in stream 10 to inlet connection 4 on the vessel 2 containing a first adsorbent bed. Preferably vessel 2 is cylindrical and of constant diameter about a center axis, or may alternatively be of decreasing diameter, or cervical in shape, along the gas flow path as depicted in FIG. 2. Within the vessel 2, there is placed adsorbent material effective to selectively adsorb the most easily sorbed contaminant. In the preferred embodiment, the most easily sorbed contaminant in feed air is water and the adsorbent material is preferably alumina based spheres. Preferably, a supportive alumina adsorbent section 5 comprises alumina spheres sized about 10 to 12 millimeters in diameter. Above the first supportive alumina section in the first adsorbent bed within vessel 2, a second section along the gas flow path preferably comprises useful alumina beads 7 having diameter in the range of about 5 to 6 millimeters. Following the useful alumina adsorbent section 7, there is preferably placed another supportive alumina adsorbent section 9 comprised of alumina spheres between about 10 and 12 millimeters in diameter. Preferably, the useful alumina section 7 is at least about 10 inches above the nearest entrance point of wet air and the upper supportive alumina section 9 is at least about 6 inches in length.

In accordance with the process of the present invention, dry gas exits the upper portion of vessel 2 through partitions 17 and flows to interspacing 21 wherein the flow direction shifts. Dry gas flows from interspacing 21 into radial adsorbent bed 31 comprising in the preferred embodiment molecular sieve material having diameters in the range of about 1 to 3 millimeters. In the preferred embodiment, the radial bed adsorbent retains carbon dioxide sorbed from the dry gas. One particularly preferred adsorbent for the retention of carbon dioxide is 13× molecular sieve having an average particle size in the range of about 2 to 3 millimeters.

Dry gas in interspacing 21 flows through partitions 31 and radial bed 29 and through the second adsorbent bed in a radial fashion from the interior to the exterior and through partitions 32 to gas recovery space 37.

In the preferred embodiment, both the first adsorbent bed and the radial adsorbent bed are contained in a containment vessel 25, wherein the walls of containment vessel 25 serve to define the interspacing 21 between the adsorbent beds and also the gas recovery space 37, and which assembly further has gas recovery outlet 40 fluidly connected to gas recovery space 37.

The preferred geometry of the adsorber system allows for construction using commonly rolled steel, welded heads and connections. Accordingly, construction costs may be minimized.

Figure 3:
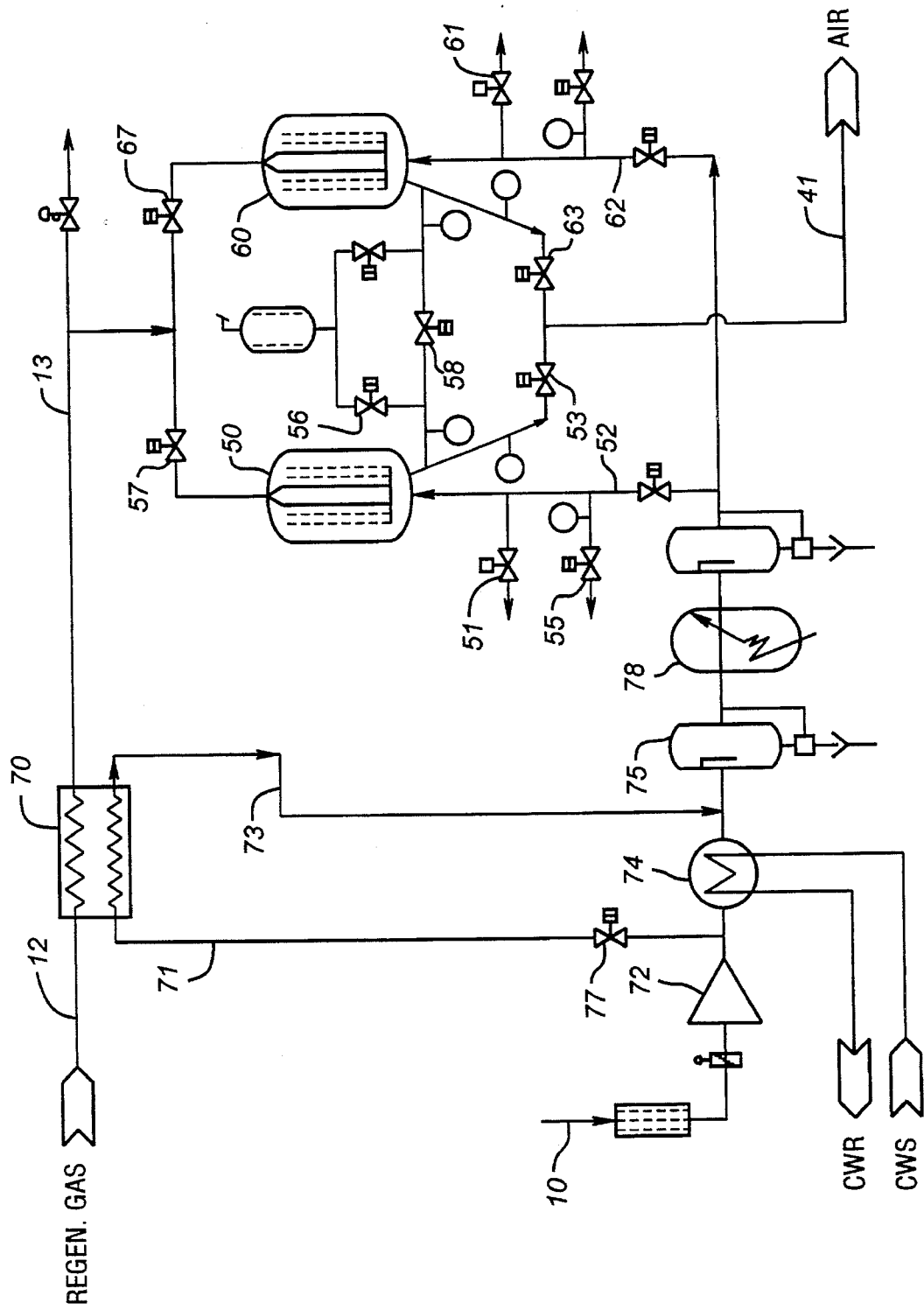
FIG. 3 depicts a preferred embodiment for an adsorber system comprising a plurality of mixed bed adsorbers in the purification of air to a cryogenic air separation process.

The process for the production of dry air from a contaminated wet air stream, and for the regeneration of the mixed bed adsorber of the present invention is best described with reference to FIG. 3 wherein a plurality of mixed bed adsorbers are operated in an overall adsorber system. Ambient feed air 10 enters compressor 72 and is normally discharged at a temperature in the range between about 200° F. and 220° F. Cooling water is used in cooler 74 to reduce the temperature of the feed stream and free water removed in separator 75 wherefrom cooled, wet gas is flowed to adsorbers 50 and 60 via streams 52 and 62. Mixed bed adsorbers 50 and 60 are assembled and operate in accordance with the above description with reference to FIG. 1. During gas production operation, purified dry gas is flowed from adsorbers 50 and 60 via stream 53 and 63, respectively, and as purified air product a process requiring clean and dry gas via stream 41.

REGENERATION

The regeneration of the adsorbent beds is carried out in the preferred embodiment according to the following procedure. First, it is necessary to depressurize the first horizontal adsorbent bed by opening valves 51 or 61, depending on the adsorber to be regenerated. In the case adsorber 50 is to be regenerated, valve 51 is opened and the first adsorbent bed in the mixed bed adsorber 50, preferably comprising alumina in horizontal placement, is depressurized, thereby ensuring moisture will not purge to the molecular sieve in the radial bed.

Next, the horizontal first adsorbent bed in adsorber 50 is heated through use of regeneration gas supplied via stream 12. In the preferred embodiment of an air separation process, the regeneration gas may be nitrogen from the air separation process. In accordance with the present invention, the regeneration gas is heated in heat exchanger 70 utilizing hot discharge gases from compressor 72. The hot discharge gases are diverted to heat exchanger 70 utilizing means well known to process engineers. It is preferred a control valve 77 operates to allow flow of hot gases via line 71 into heat exchanger 70, returning via stream 73 whereby the loop 71, 70, 73 has a lower overall pressure drop than cooling heat exchanger 74. Heated regeneration gas flows to the adsorbers from heat exchanger 70 via line 13. Again, in the case where adsorber 50 is to be regenerated, valve 57 is selectively operated to allow flow of hot regeneration gas into the first adsorbent bed within mixed bed adsorber 50. With valve 51 and 55 remaining open, the regeneration gas flows through the first adsorbent bed and exits through valve 51 and 55.

In the preferred method of regeneration, the radial adsorbent bed is also heated at the time the horizontal bed is subjected to heated regeneration gas. This is preferably accomplished by opening exit valve 56, which is fluidly connected to the gas outlet 40 depicted in FIG. 1. When sufficient time has elapsed for the sieve material in the radial adsorbent bed to be regenerated, valve 56 is closed, while hot regeneration gas continues to flow through the horizontal alumina adsorbent bed. In this manner, energy is not unnecessarily used to heat molecular sieve adsorbent in the radial bed beyond that necessary to regenerate the adsorbent. In accordance with the present invention, it is possible to selectively contact only the alumina adsorbent in the horizontal adsorbent bed with regeneration gas to continue the regeneration of the alumina material for the longer time required relative to the molecular sieve adsorbent.

At the time the alumina adsorbent is regenerated, and therefore, the regeneration of completed adsorbent, the heating of the regeneration gas in heat exchanger 70 is discontinued by throttling or closing valve 77 to eliminate the heat source. With valve 77 closed, only unheated regeneration gas continues to contact one or both of the horizontal or radial adsorbent beds.

When the gas exiting the adsorber 50 is the same or within a predetermined temperature of the unheated regeneration gas entering adsorber 50, valves 57, 56 and 51 and 55 are closed. Thereafter, valve 58 may be opened to equalize the pressure in regenerated adsorber 50 and the alternate adsorber 60. Valves 52 and 53 are then opened to place regenerated adsorber 50 into production service. It may be preferable for heat exchanger 70 to remain in heating operation of regeneration gas during the whole cycle except the cooling step of the cycle. In this way, the refrigeration duty in optional refrigeration unit 78 is lessened.

Following regeneration of the first adsorber 50, and its return to service as described above, it remains available for the operator to next regenerate alternate adsorber 60 in the same manner as described above with reference to the first adsorber. One skilled in the art will recognize various valving and piping adaptations depicted in FIG. 3 as necessary modifications to carry out the regeneration procedure described above on the alternate adsorber 60.

Since each bed is independent of each other with regard to its own constraints; including velocity, regeneration heat, with the process and system of the present invention, regeneration may be optimized throughout the cycle.

In air separation application, it is possible to use the entire waste flow from an air separation plant to regenerate the beds because gas velocity and associated fluidization of adsorbent is not present during regeneration of the adsorber systems of the present invention. This translates to a shorter regeneration time, and therefore, increased operation time, and more compact adsorber designs.

With the preferred use of heat of compression to heat regeneration gas, regeneration heat is available at all times and no electric or steam heaters are required. This is a significant savings in energy costs and increases reliability.

Compared with horizontal beds, the air velocity in the adsorbers of the present invention may be increased dramatically since fluidization in the bed is suppressed by larger alumina spheres. Accordingly, the physical size of the adsorber may be reduced, with all the associated savings.

What is claimed is:

1. A process for removing contaminants from a gaseous air feed stream comprising flowing said air feed stream to a first adsorbent zone and contacting said gaseous air feed stream with a first adsorbent displaced about an axis effective in the adsorption of water by flowing said gaseous air stream in a direction within said first adsorbent zone substantially parallel with the axis to form a dry gas;

flowing said dry gas from said first adsorbent zone to a second adsorbent zone comprising a second adsorbent in a radial bed having an interior and an exterior and which is disposed in a radial arrangement about said first adsorbent zone and also about said axis;

contacting said dry gas with said second adsorbent effective in retention of carbon dioxide in said second adsorbent zone by flowing said dry gas through said radial bed from the interior to the exterior of said radial bed.

2. The process as recited in claim 1 wherein said gaseous air feed stream is compressed to between 50 and 250 psia.

3. The process as recited in claim 1 wherein said first adsorbent comprises alumina spheres, and said second adsorbent is a molecular sieve.

4. The process as recited in claim 3 wherein said first adsorbent zone comprises a lower zone of alumina spheres between about 10 mm and about 12 mm in diameter, and a main adsorbent section comprising alumina spheres between about 5 mm and about 6 mm in diameter.

5. The process as recited in claim 1 wherein said flowing of said dry through said radial adsorbent bed is substantially perpendicular to said axis, feed stream gas through said first adsorbent zone.

6. The process as recited in claim 1 wherein said first adsorbent zone and second adsorbent zone are contained within a substantially cylindrical containment vessel having an inlet fluidly connected to said first adsorbent zone and an outlet fluidly connected to said exterior of said second adsorbent zone.

7. The process as recited in claim 6 further comprising removing a purified dry gas from said outlet of said containment vessel.

8. The process as recited in claim 1 further comprising the regenerating said first adsorbent and regenerating said second contacting said first adsorbent and said second adsorbent with regeneration gas at an elevated temperature; and discontinuing said contacting of said second adsorbent with said regeneration gas while continuing the contacting of said first adsorbent with said regeneration gas to continue regeneration of said first adsorbent.

9. The process as recited in claim 8 wherein said regeneration gas is nitrogen derived from an air separation process.

10. The process as recited in claim 8 wherein said regeneration gas is heated by indirect heat exchange with compressed air at an elevated temperature.

11. The process as recited in claim 8 further comprising regenerating an auxiliary series adsorber Comprising a first auxiliary adsorbent and a second auxiliary adsorbent by contacting said first auxiliary adsorbent and said second auxiliary adsorbent of said auxiliary series adsorber with regeneration gas at an elevated temperature;

discontinuing said contacting of said second auxiliary adsorbent with regeneration gas while continuing the contacting of said first auxiliary adsorbent with regeneration gas to continue regeneration of said first auxiliary adsorbent; and returning said auxiliary Series adsorber to service.

12. A system for the adsorption of gas contaminants from an air stream comprising means to flow a gaseous air feed stream to a first particulate bed displaced about an axis means to flow said gaseous air stream within said first particulate bed substantially parallel to said axis for adsorption of water from said feed stream to produce from said first particulate bed a dry resulting gas, means to flow said dry resulting gas from said first particulate bed through a radial bed of a second particulate material which preferentially adsorbs carbon dioxide from said dry resulting gas; and means to recover a product gas substantially free of water and carbon dioxide from said radial bed.

13. The adsorber system as recited in claim 12 wherein said first particulate bed and said radial bed are within a larger vessel which is assembled to define containment means for flowing said dry resulting gas to said radial bed and means for recovering said product gas from said radial bed.

14. The adsorber system as recited in claim 12 further comprising means to flow regeneration gas selectively to either of said first particulate bed or said radial bed.

15. The adsorber system as recited in claim 14 further comprising a heat exchanger to heat said regeneration gas by indirect heat exchange with another fluid.

16. The adsorber system as recited in claim 15 further comprising means to flow gas heated by compression to said heat exchanger.

17. The adsorber system as recited in claim 12 further comprising:

a second adsorber comprising a second particulate bed for adsorption of water in a second radial bed; and means to selectively flow said feed stream to said first particulate bed or said second adsorber.

* * * * *

UNITED STATES PATENT AND TRADEMARK OFFICE
CERTIFICATE OF CORRECTION

PATENT NO. : 5,593,475
DATED : JAN. 14, 1997
INVENTOR(S) : PHAM H. MINH

It is certified that error appears in the above-identified patent and that said Letters Patent is hereby corrected as shown below:

In claim 5, line 24, after the word "dry" insert the word --gas--.

In claim 5, line 24, after the word "radial" delete the word --adsorbent--.

In claim 5, line 25, after the word "axis" delete ", feed stream gas through said first adsorbent zone--.

In claim 8, at the end of line 36, after the words "comprising the" insert the words --steps of--.

In claim 8, line 38, after the word "second" and before the word "contacting" insert the words --adsorbent by--.

Signed and Sealed this

Thirteenth Day of May, 1997

Attest:

BRUCE LEHMAN

Attesting Officer

Commissioner of Patents and Trademarks